United States Patent
Okuya

(10) Patent No.: US 11,561,306 B2
(45) Date of Patent: Jan. 24, 2023

(54) POSITION RECOGNIZING DEVICE

(71) Applicant: DENSO CORPORATION, Kariya (JP)

(72) Inventor: Tsubasa Okuya, Kariya (JP)

(73) Assignee: DENSO CORPORATION, Kariya (JP)

( * ) Notice: Subject to any disclaimer, the term of this patent is extended or adjusted under 35 U.S.C. 154(b) by 938 days.

(21) Appl. No.: 16/342,711

(22) PCT Filed: Oct. 13, 2017

(86) PCT No.: PCT/JP2017/037187
§ 371 (c)(1),
(2) Date: Apr. 17, 2019

(87) PCT Pub. No.: WO2018/074357
PCT Pub. Date: Apr. 26, 2018

(65) Prior Publication Data
US 2019/0293793 A1    Sep. 26, 2019

(30) Foreign Application Priority Data

Oct. 20, 2016  (JP) .............................. JP2016-206045

(51) Int. Cl.
*G01S 17/42*   (2006.01)
*G01S 17/89*   (2020.01)
(Continued)

(52) U.S. Cl.
CPC ............ *G01S 17/931* (2020.01); *B60R 21/00* (2013.01); *G01S 7/4802* (2013.01); *G01S 17/42* (2013.01); *G01S 17/93* (2013.01); *G08G 1/16* (2013.01)

(58) Field of Classification Search
CPC ...... G01S 17/931; G01S 7/4802; G01S 17/42; G01S 17/93; G01S 7/4817; G01S 7/4876;
(Continued)

(56) References Cited

U.S. PATENT DOCUMENTS

2006/0103927 A1   5/2006   Samukawa et al.
2006/0115113 A1   6/2006   Lages et al.
(Continued)

FOREIGN PATENT DOCUMENTS

DE   10 2004 003 850 A1   8/2005
JP   4-054478 A   2/1992
(Continued)

*Primary Examiner* — Daniel L Murphy
(74) *Attorney, Agent, or Firm* — Maschoff Brennan

(57) ABSTRACT

A position recognizing device according to one embodiments of the present disclosure includes a ranging point acquiring section, a region determining section, and a ranging point excluding section. The ranging point acquiring section is configured to acquire ranging point information in which distances to ranging points are associated with each of electromagnetic wave applying directions. The region determining section is configured to determine whether an object region that represents a region encompassed by joining ranging points that are in close proximity to one another exists at a position closer than a specific ranging point representing a certain ranging point among the ranging points. The ranging point excluding section is configured to define the ranging point in front of which the object region exists as a false image point at which no object actually exists and exclude the false image point from the ranging point information.

11 Claims, 9 Drawing Sheets

(51) Int. Cl.
    *G01S 17/93*         (2020.01)
    *G01S 17/931*       (2020.01)
    *G01S 7/48*          (2006.01)
    *G08G 1/16*         (2006.01)
    *B60R 21/00*       (2006.01)

(58) Field of Classification Search
    CPC .......... G08G 1/16; G08G 1/168; B60R 21/00;
                                                       B60R 21/0134
    USPC ....................................................... 356/5.01
    See application file for complete search history.

(56) References Cited

U.S. PATENT DOCUMENTS

2012/0242799 A1    9/2012    Saito
2014/0022110 A1    1/2014    Itohara et al.

FOREIGN PATENT DOCUMENTS

| JP | 2009-133761 A | 6/2009 |
|---|---|---|
| JP | 2011-191227 A | 9/2011 |
| JP | 2014-119285 A | 6/2014 |
| WO | 2012128096 A1 | 9/2012 |

POSITION RECOGNIZING DEVICE

CROSS-REFERENCE TO RELATED APPLICATION

The present application is a national stage application of PCT Application No. PCT/JP2017/037187, filed on Oct. 13, 2017, which claims the benefit of priority based on Japanese Patent Application No. 2016-206045 filed in Japan Patent Office on Oct. 20, 2016, and all the contents of Japanese Patent Application No. 2016-206045 are incorporated in the present international application by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a position recognizing device that recognizes the position of an object in accordance with a reflected wave of an electromagnetic wave that has been transmitted.

BACKGROUND ART

The following Cited Document 1 discloses, as the position recognizing device, a technique that utilizes the characteristics that a detection point forming a false image is located at generally the same position as an object but further away and determines that such a detection point is a false image.

CITATION LIST

Patent Literature

[PTL 1] Japanese Laid-Open Patent Publication No. 2014-119285

SUMMARY OF THE INVENTION

The inventors' detailed study revealed a problem that, according to the technique of Cited Document 1, under circumstances where a tall vehicle, such as a truck, actually exists beyond an object located in front, and where such a positional relationship does not change, the detection point representing the truck is erroneously recognized as a false image.

One aspect of the present disclosure is to allow the position recognizing device, which recognizes the position of an object in accordance with reflected waves of transmitted electromagnetic waves, to accurately recognize whether the object is a false image.

The position recognizing device according to one embodiment of the present disclosure includes a ranging point acquiring section, a region determining section, and a ranging point excluding section.

The ranging point acquiring section is configured to acquire ranging point information in which distances to a plurality of ranging points are associated with each of electromagnetic wave applying directions. The region determining section is configured to determine whether an object region that represents a region encompassed by joining ranging points that are in close proximity to one another exists at a position closer than a specific ranging point representing a certain ranging point among the ranging points. The ranging point excluding section is configured to define a ranging point in front of which the object region exists as a false image point representing a point where no object actually exists and exclude the false image point from the ranging point information.

According to the position recognizing device described above, if the object region exists in front of the specific ranging point, the specific ranging point is recognized as the false image point caused due to, for example, reflection off the object. Thus, whether the object is the false image is recognized with high accuracy.

Reference signs in parentheses in the claims indicate the correspondence to specific means in the embodiment described below as one aspect and do not limit the technical scope of the present disclosure.

DESCRIPTION OF THE EMBODIMENTS

Hereinafter, an embodiment of the present disclosure will be described with reference to the drawings.

1. Embodiment

[1-1. Configuration]

Figure 1:
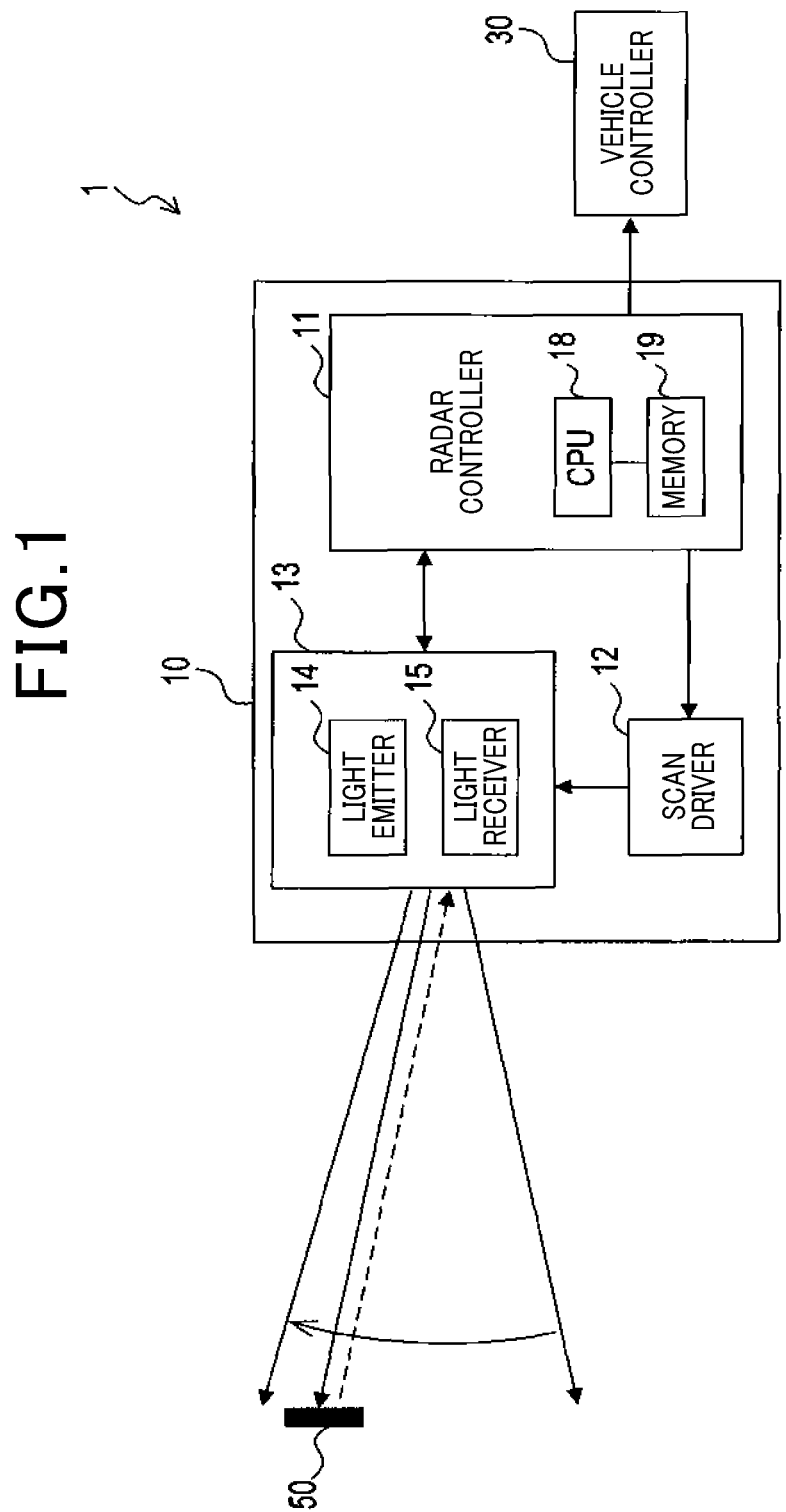
FIG. 1 is an explanatory diagram illustrating the schematic configuration of a driving assistance system.

A driving assistance system 1 shown in FIG. 1 is installed in, for example, a vehicle such as a passenger car and includes a radar device 10. The driving assistance system 1 may also include a vehicle controller 30. The vehicle that is equipped with the driving assistance system 1 is hereinafter also referred to as a "host vehicle". The radar device 10 includes a radar controller 11, a scan driver 12, and an optical unit 13.

The radar controller 11 is mainly constituted by a known microcomputer, which includes a CPU 18 and a memory 19. The memory 19 is at least one of semiconductor memories such as a RAM, a ROM, and a flash memory. Various functions of the radar controller 11 are performed by the CPU 18 by executing programs stored in a non-transitory tangible storage medium. In this example, the memory 19 corresponds to the non-transitory tangible storage medium that stores the programs.

When the programs are executed, methods corresponding to the programs are executed. The non-transitory tangible storage medium refers to a storage medium except an electromagnetic wave. The number of the microcomputers constituting the radar controller 11 may be one or more than one.

The radar controller 11 includes a function of at least an object recognizing process, which will be discussed below, as the configuration of the function performed by the CPU 18 by executing the programs. The technique for performing these functions that configure the radar controller 11 is not limited to software. Some or all of the functions may be performed by one or multiple pieces of hardware. For example, in a case in which the above-mentioned function is performed by an electronic circuit, which is hardware, the electronic circuit may be implemented as a digital circuit including multiple logic circuits, or an analog circuit, or a combination of these circuits.

The scan driver 12 is configured as, for example, an actuator such as a motor. The scan driver 12 is configured to turn the optical unit 13 to any direction in the horizontal direction and the vertical direction upon receipt of an instruction from the radar controller 11. Every time a scan starting signal from the radar controller 11 is received, the scan driver 12 drives the optical unit 13 to enable one cycle of scanning in which reflected light is obtained from the entire region to which a laser beam should be applied.

The optical unit 13 includes a light emitter 14, which emits a laser beam in response to an instruction from the radar controller 11, and a light receiver 15, which receives reflected light when the laser beam from the light emitter 14 is reflected by an object 50. The laser beam from the light emitter 14 is shown by solid arrows in FIG. 1. The reflected light is shown by a dashed arrow in FIG. 1.

The scan driver 12 only needs to be configured to be capable of consequently changing the direction in which the light emitter 14 emits a laser beam to be the same as the direction in which the light receiver 15 is capable of receiving the reflected light. For example, instead of the optical unit 13, the scan driver 12 may be configured to drive a mirror provided in the optical unit 13 where the mirror reflects the laser beam and the reflected light in any direction.

In this case, a configuration may be employed in which the scanning laser beam moves in the horizontal direction by rotating the mirror having multiple reflective surfaces by the scan driver 12 and the scanning laser beam moves while swinging the laser beam also in the vertical direction by setting the angles of the reflective surfaces at different angles. Alternatively, a mechanism that turns the mirror having one reflective surface to any direction may be employed.

The scan driver 12 may be configured to change the direction of only the light receiver 15. In this case, the light emitter 14 may be configured to be capable of emitting a laser beam to part or all of the region across which the light receiver 15 scans without changing the direction of the light emitter 14.

As described above, in the present embodiment, the radar device 10 is configured as a laser radar that detects an object ahead of the host vehicle as ranging points by intermittently emitting a laser beam, which is an electromagnetic wave, while scanning in the direction ahead of the host vehicle, which is the travelling direction, and receiving the reflected light. The laser beam does not necessarily have to be applied ahead of the host vehicle, but may be applied to a predetermined region in any direction around the host vehicle.

Figure 2:
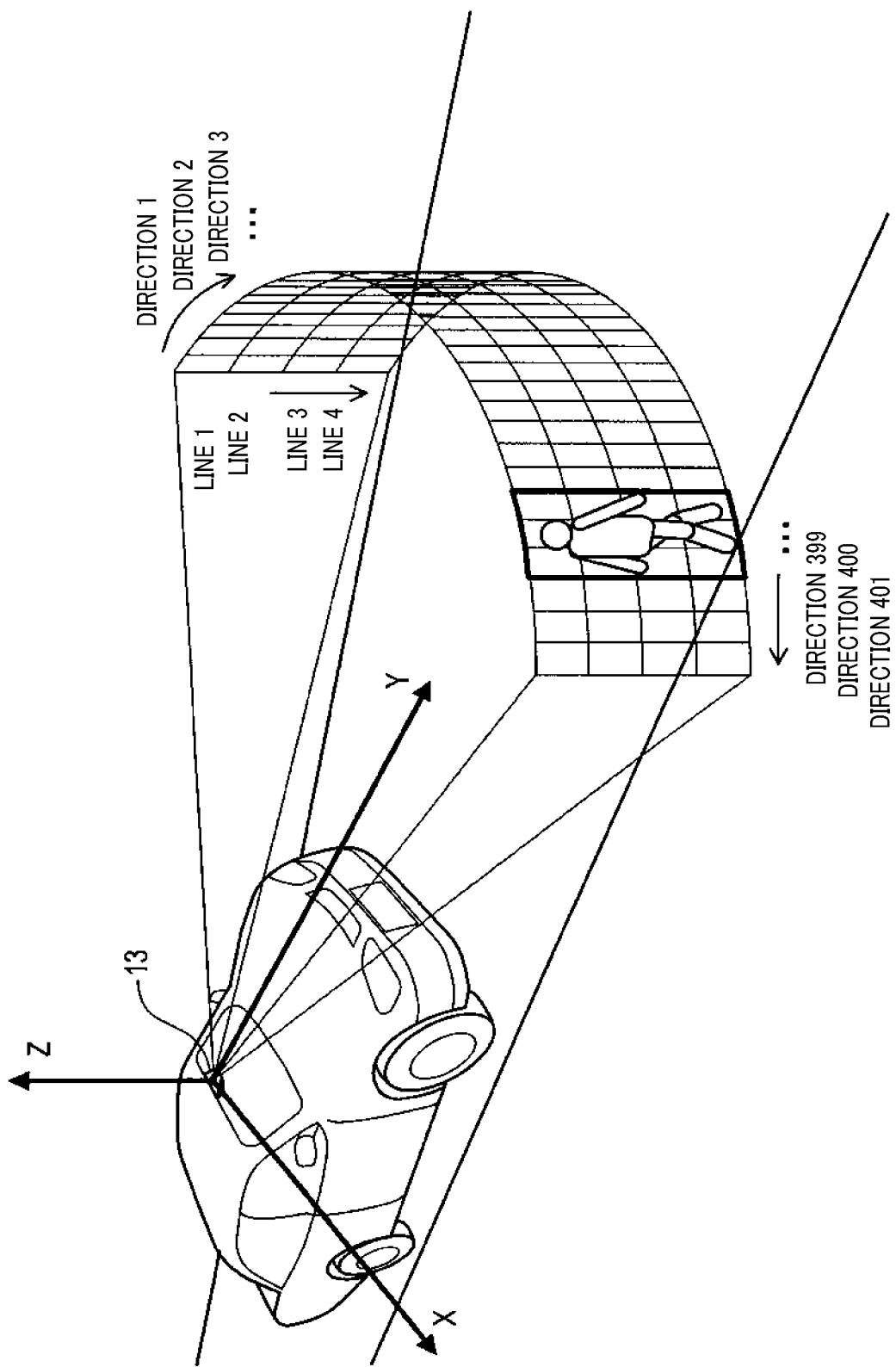
FIG. 2 is a schematic diagram illustrating a region to which a laser beam is applied.

In the radar device 10 of the present embodiment, the radar controller 11 uses the scan driver 12 as described above to scan a predetermined region with the laser beam emitted from the optical unit 13. More specifically, as shown in FIG. 2, the radar controller 11 projects the laser beam intermittently at equal angles while changing the range to which the laser beam is applied rightward in the horizontal direction from the left upper corner to the right upper corner in the predetermined region. When the laser beam reaches the right upper corner, the laser beam is applied again from a region lower than the left upper corner by a predetermined angle while changing the range to which the laser beam is applied rightward in the horizontal direction.

In particular, in the present embodiment, the laser beam is projected in 401 directions in the horizontal direction and in four lines corresponding to four directions in the vertical direction. The radar device 10 sequentially applies the laser beam to the entire region of the predetermined region by repeating this operation. The radar device 10 detects the position of an object each time the laser beam is projected in accordance with the point in time at which the reflected light is detected and the direction in which the laser beam was applied.

The entire region to which the laser beam is applied is divided into a matrix in accordance with the regions to which the laser beam is applied. A number is assigned to each region, so that the applying direction of the laser beam can be identified. For example, as shown in FIG. 2, numbers are assigned sequentially from the left in the horizontal direction, and the numbers are referred to as the directional numbers. Furthermore, numbers are assigned sequentially from the top in the vertical direction, and the numbers are referred to as the line numbers.

Figure 3:
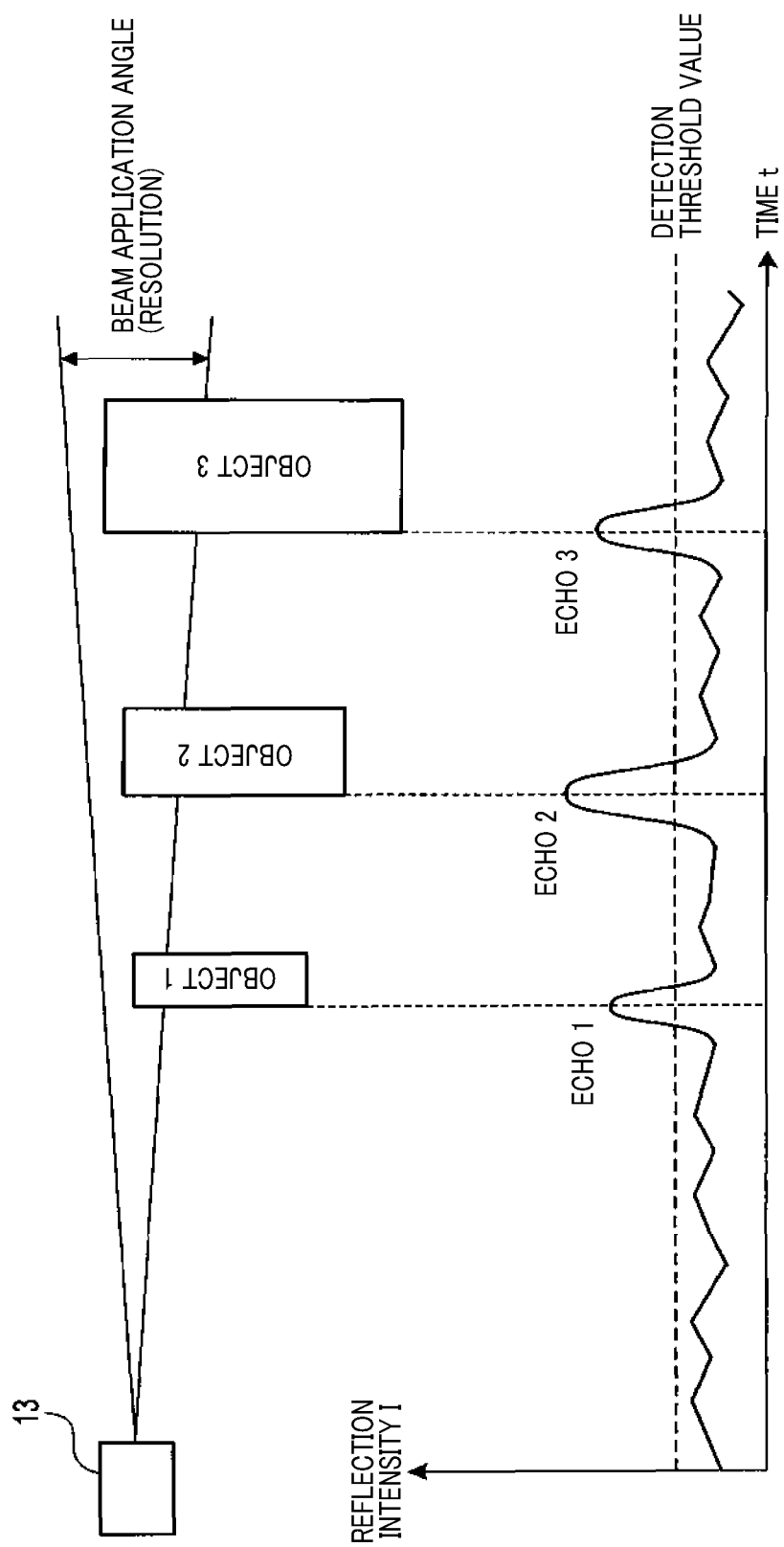
FIG. 3 is an explanatory diagram illustrating an outline of a multi-echo function.

The radar device 10 of the present embodiment is provided with a multi-echo function. That is, as shown in FIG. 3, if a laser beam emitted at a time is reflected by multiple objects 1, 2, and 3, multiple signals representing the objects, that is, multiple echoes, may be detected. In this case, the radar device 10 stores the reflection intensity and the position of the ranging points of up to the three closest objects.

Next, the vehicle controller 30 is configured as a known computer including, for example, a CPU, a ROM, and a RAM and performs a process for controlling the direction of the host vehicle and various processes such as informing a driver in accordance with programs stored in, for example, the ROM. For instance, upon receipt of an instruction from the radar device 10 indicating to change the direction of the host vehicle or to perform driving assistance to prompt changing the direction, the vehicle controller 30 only needs to output a control signal corresponding to the instruction to any of, for example, a display, a voice output device, a brake, and a steering device.

[1-2. Process]

Figure 4:
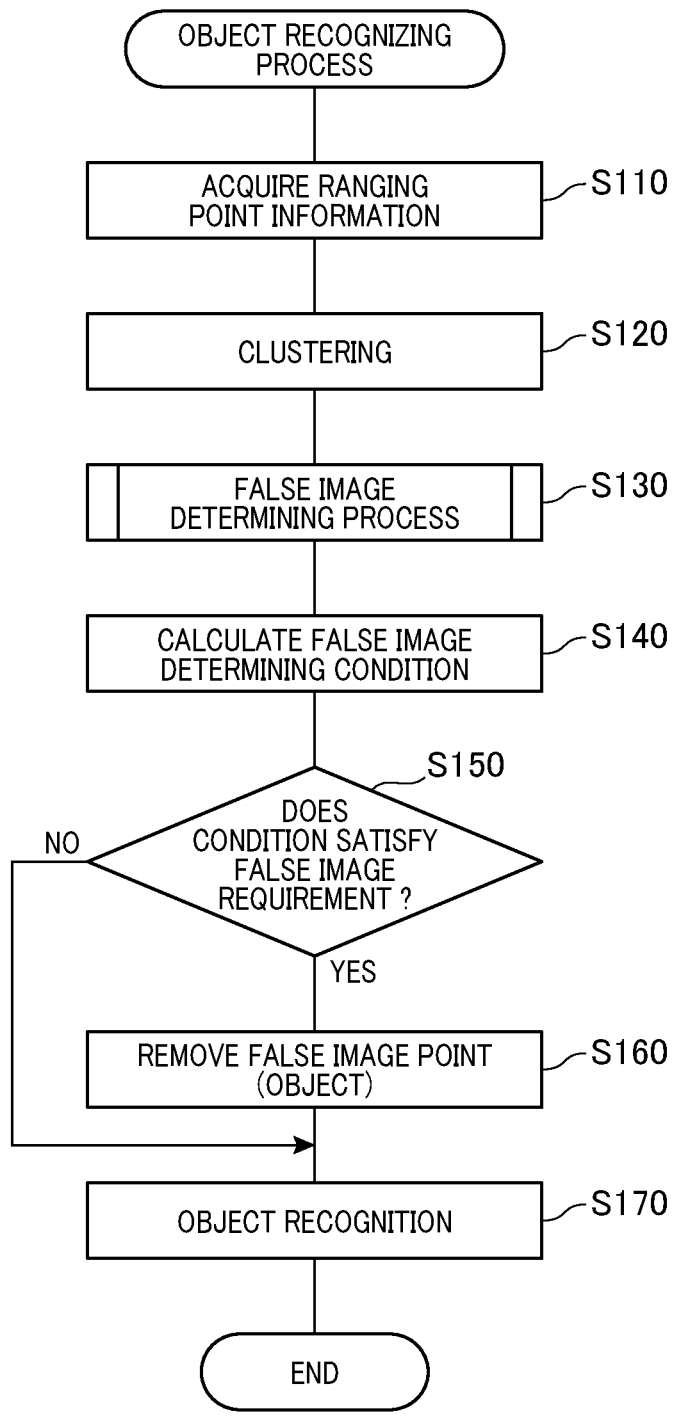
FIG. 4 is a flowchart showing an object recognizing process.

Next, the object recognizing process executed by the radar controller 11 will be described using the flowchart of FIG. 4. The object recognizing process is a process that removes one or more false image point(s) from ranging points obtained using the optical unit 13 and recognizes the type and the shape of an object using the ranging points after the false image point has been removed. The false image point(s) is/are (a) ranging point(s) that does(do) not indicate the position of an object correctly and is/are (a) ranging points where an object does not actually exist.

Furthermore, the object recognizing process is started, for example, every time one cycle of ranging point data is obtained. More specifically, as shown in FIG. 4, first, the ranging point information is acquired at S110. The ranging point information is the data of one cycle of ranging points representing the coordinates of a target obtained for each applied region of the laser beam and is the data in which the distances to the ranging points corresponding to multiple echoes are associated with each of the directions and the lines of the applying direction of the electromagnetic wave. More specifically, a line V, a direction H, and distances K1, K2, and K3 of echoes K are associated with each other.

Subsequently, at S120, clustering is performed. Clustering is a process that identifies and labels the ranging points included in the ranging point information object by object. Clustering assigns an object I and a configuration point P to each piece of the ranging point data.

The object I is a serial number for identifying the object, and the ranging points of the same object are given the same number. The object number is assigned consecutively from I=1 to I=N. The configuration point P is a serial number sequentially given to the ranging points configuring each object I, and the numbers are sequentially assigned from P=1 to P=Pmax. A known process can be used for clustering.

Subsequently, at S130, a false image determining process is executed. The false image determining process is a process that determines whether each of the ranging points is a false image point and stores the ranging point that has a possibility of being a false image point after associating the ranging point with the information indicating that it may be a false image point. The information indicating that it may be a false image point is stored as a temporary false image point. The details of the process will be discussed below.

Subsequently, at S140, a false image determining condition is calculated. The false image determining condition represents the result of monitoring the existence of the false image point on a time-series basis. The false image determining condition may include the frequency of being determined as the temporary false image point, the number of times being consecutively determined as the temporary false image point, and/or the number of temporary false image points included in the same object. The frequency of being determined as the temporary false image point may be obtained using all the determination results from when the process has been started for the first time, or may be obtained from the recent determination results the number of which is previously set.

Subsequently, at S150, it is determined whether the false image determining condition satisfies a false image requirement. The false image requirement refers to the requirement for concluding that the temporary false image point, or the object including the temporary false image point is the false image. The false image requirement includes, for example, being determined as the temporary false image point consecutively by a predetermined specified number of times or more. Furthermore, the false image requirement may include, for example, a case in which the frequency of being determined as the temporary false image point is greater than or equal to a predetermined threshold value, or a case in which the number of the temporary false image points included in the same object is greater than or equal to a predetermined determination number.

If the false image determining condition satisfies the false image requirement, at S160, the ranging points of the object including the temporary false image point are determined as the false image points and are excluded from the ranging point information. If the false image determining condition does not satisfy the false image requirement, the process proceeds to S170.

Subsequently, at S170, object recognition is performed. In the object recognition, for example, a known process such as pattern matching of comparing the shape of the clustered ranging point cloud with previously prepared models is performed to recognize, for example, the type and the size of the object. A known technique other than the above-mentioned technique may be employed for the process of object recognition.

Figure 5:
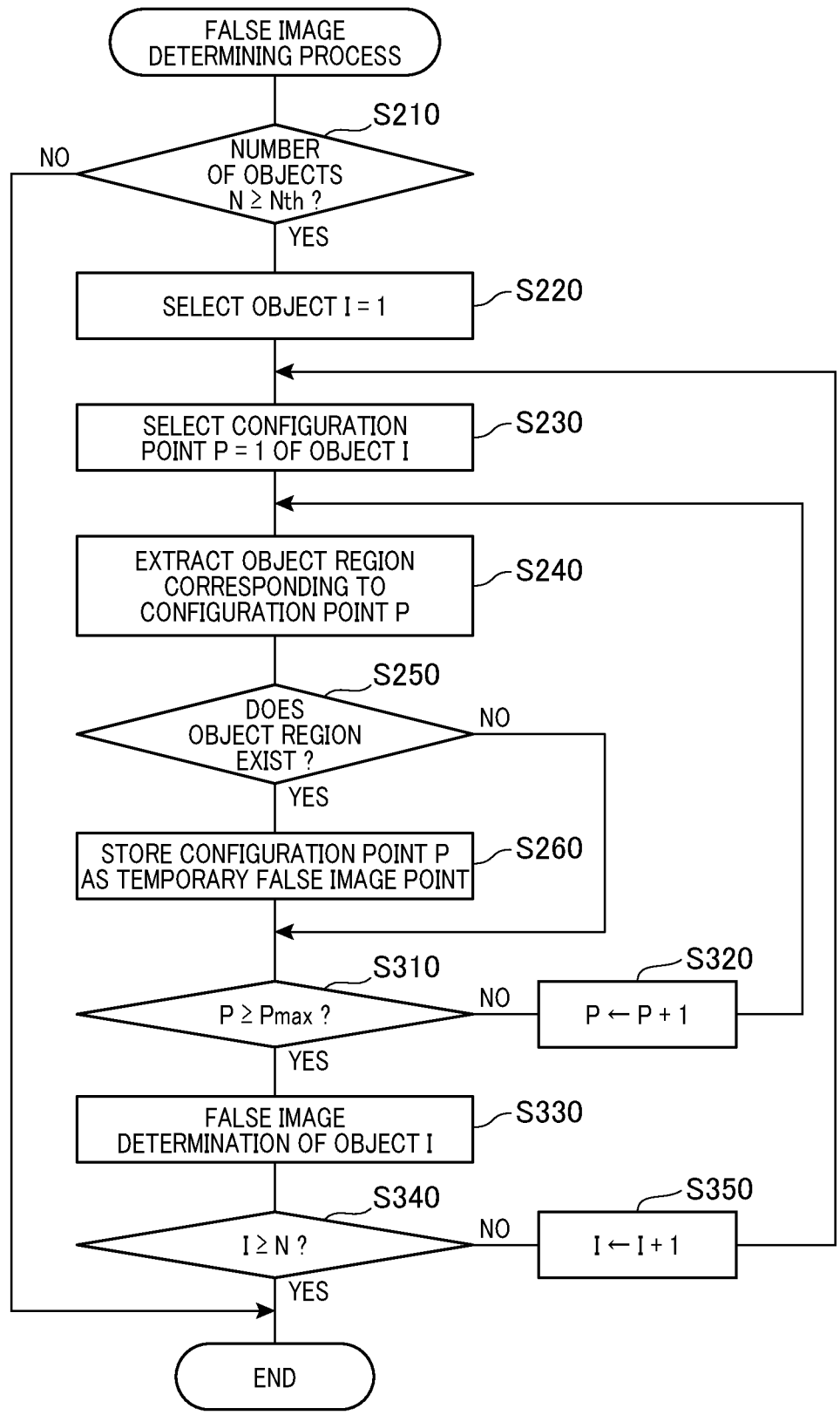
FIG. 5 is a flowchart showing a false image determining process of the object recognizing process.

Next, the false image determining process of the object recognizing process will be described using the flowchart of FIG. 5. In the false image determining process, first, at S210, the number of objects N and a predetermined threshold value Nth of the number of objects are compared with each other as shown in FIG. 5. The threshold value of the number of objects is set in order to determine whether the false image can physically exist in the detected object and is set to a value like 1 or 2, for example. This is because, if the detected number of objects is 0, the false image does not need to be determined. If it is difficult to determine whether the object is a false image when the number of objects is 1, the threshold value is preferably set to 2.

If the number of objects N is less than the threshold value Nth, the false image determining process is terminated. If the number of objects N is greater than or equal to the predetermined threshold value Nth of the number of objects, at S220, the object having the object number I=1 is selected.

Subsequently, at S230, the configuration point P=1, which is one of the ranging points included in the selected object number I, is selected. Subsequently, at S240, the object region corresponding to the configuration point is extracted. The process extracts, as the object region, a region encompassed by joining the ranging points that are in close proximity to one another located at a position closer than the configuration point P selected from among the ranging points. The object region exists in such a manner as to hide the configuration point P when the configuration point P is viewed from the host vehicle.

Note that the ranging points that are in close proximity to one another refer to, for example, ranging points located within a predetermined range from the host vehicle. The ranging points that are located in close proximity to one another are treated as being located on the same plane. The same plane includes substantially same plane.

As described above, in a case in which the object region is determined using the ranging points located on the same plane, the plane is defined as a configuration surface, and the configuration surface that is located in front of the configuration point P is preferably extracted. At this time, if the ranging points that are located in the same applying direction and closer than the configuration point P are obtained, the configuration surface may be extracted from the surrounding points adjacent to the closer ranging points.

The selected configuration point P is defined as a focus point P (V, H), and if there is a ranging point located in front of the focus point P in the same applying direction detected by the multi-echo function, the ranging point is defined as a reference point $P^-$ (V, H). Two adjacent configuration points that are adjacent to the reference point in the vertical direction are defined as $V^-$ (V−1, H) and $V^+$ (V+1, H), and two adjacent configuration points that are adjacent to the reference point in the horizontal direction are defined as $H^-$ (V, H−1) and $H^+$ (V, H+1).

Figure 6:
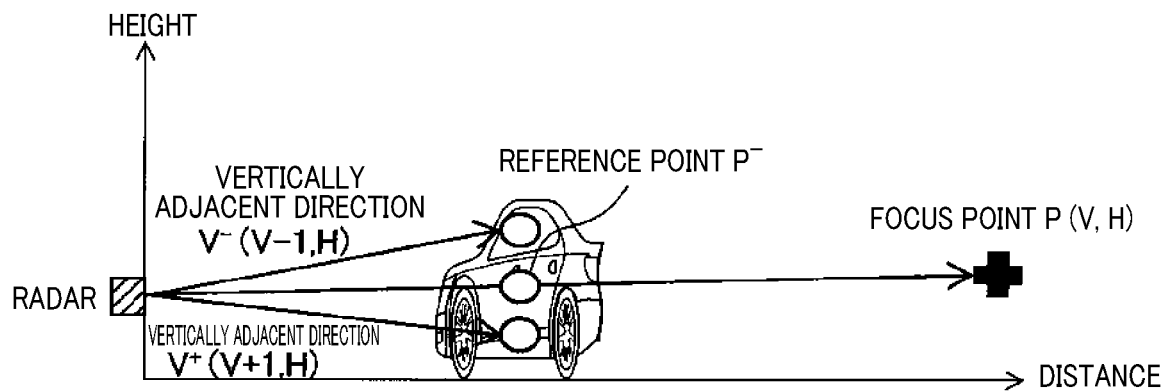
FIG. 6 is a side view of an arrangement of ranging points when a focus point is a false image point.
Figure 7:
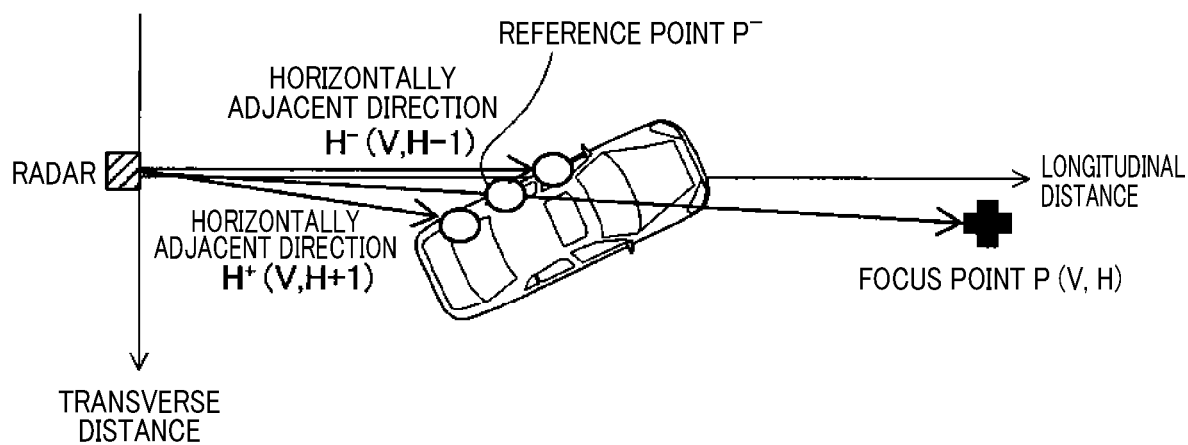
FIG. 7 is a plan view of an arrangement of ranging points when a focus point is a false image point.

If the focus point P (V, H) is a false image point obtained as a ranging point representing an object at a different position due to, for example, reflection off a vehicle body, the adjacent configuration points $V^-$, $V^+$, $H^-$, and $H^+$ tend to be arranged generally on the same plane to surround the reference point P as shown in FIGS. 6 and 7.

Figure 8:
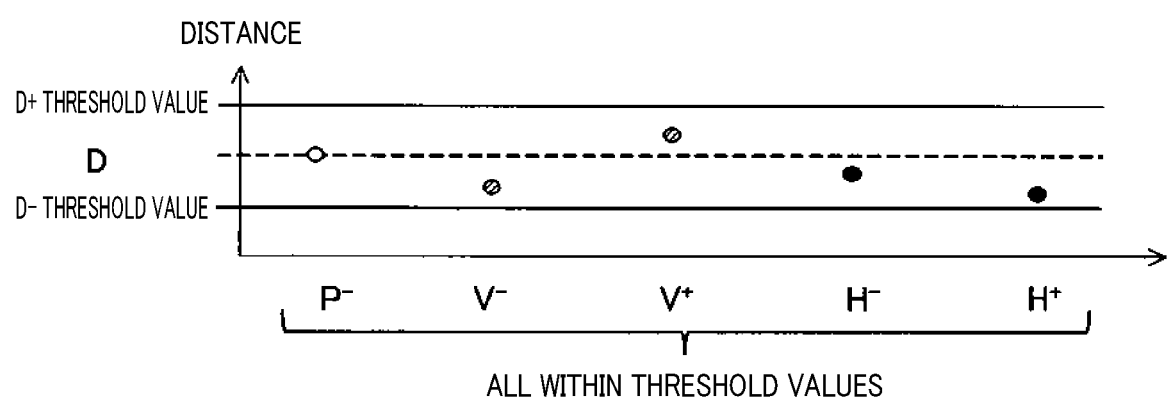
FIG. 8 is a graph showing the distances to ranging points when a focus point is a false image point.

That is, the focus point P and the adjacent configuration points V$^-$, V$^+$, H$^-$, and H$^+$ are detected in relatively close proximity to one another. Thus, as shown in FIG. 8, when the distance to the reference point P is denoted D, and the threshold values D+ and D− are set in the neighborhood of the distance D, the adjacent configuration points V$^-$, V$^+$, H$^-$, and H$^+$ tend to fall within the range of the threshold values D+ and D−.

Figure 9:
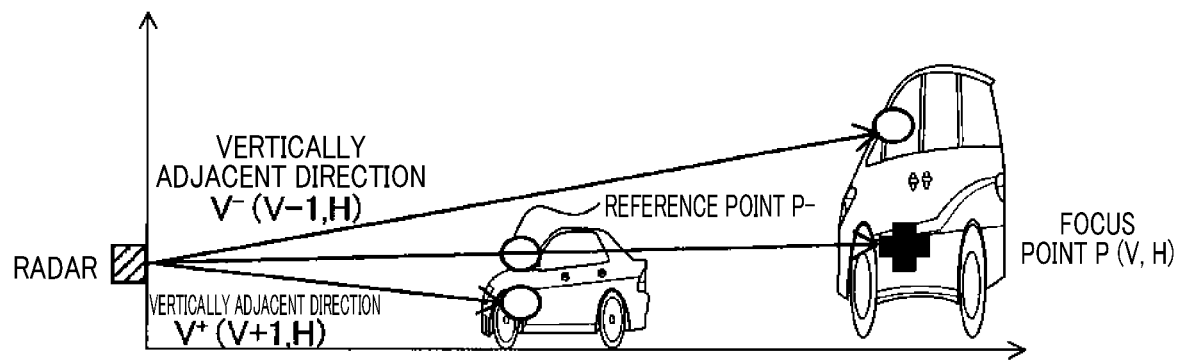
FIG. 9 is a side view of an arrangement of ranging points when a focus point is not a false image point.
Figure 10:
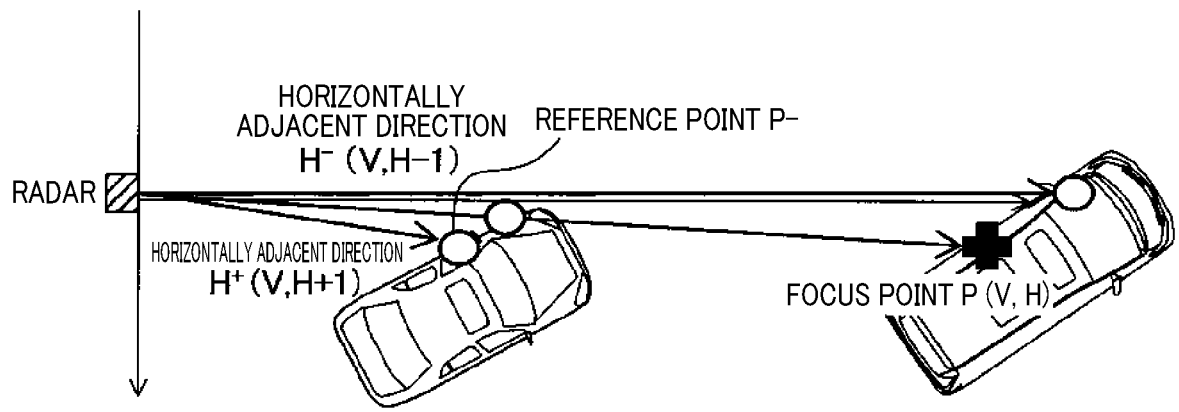
FIG. 10 is a plan view of an arrangement of ranging points when a focus point is not a false image point.

If the focus point P is the actual ranging point due to, for example, passing by the edge of the vehicle body, the adjacent configuration points V$^-$, V$^+$, H$^-$, and H$^+$ are not arranged on the same plane, and the adjacent configuration points V$^-$, V$^+$, H$^-$, and H$^+$ do not form a region surrounding the reference point P as shown in FIGS. 9 and 10. That is, if a region is formed by joining some of the adjacent configuration points V$^-$, V$^+$, H$^-$, and H$^+$ that are in close proximity to the reference point P, the region does not hide the configuration point P when the configuration point P is viewed from the host vehicle, and the configuration point P can be seen.

Figure 11:
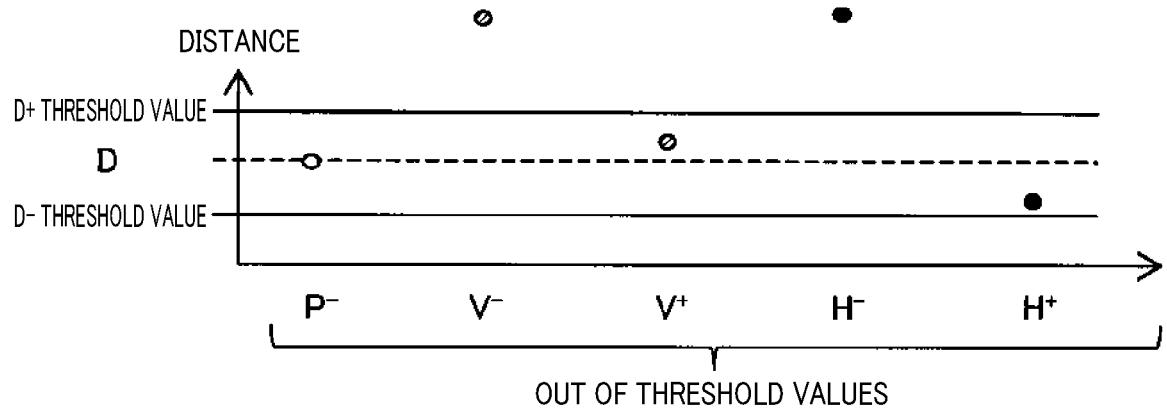
FIG. 11 is a graph showing the distances to ranging points when a focus point is not a false image point.

In the example shown in FIGS. 9 and 10, there tend to be ranging points in which the distances to the adjacent configuration points V$^-$, V$^+$, H$^-$, and H$^+$ fall outside the range of the threshold values D+ and D− as shown in FIG. 11.

At S250, it is determined whether there is a possibility that the configuration point P is the false image point depending on whether the object region exists. If the object region does not exist at S250, the process proceeds to S310.

If the object region exists, at S260, the configuration point P is stored as the temporary false image point in the memory 19. In this process, the configuration point P is not confirmed as the false image point, but is defined as the temporary false image point meaning that there is a possibility that the configuration point P is the false image point. In the process of S250, if there is no ranging point detected by the multi-echo function corresponding to the focus point P, it may be immediately determined that the object region does not determine.

Subsequently, at S310, the value of the configuration point P and the maximum value Pmax of P are compared with each other. If the value of the configuration point P is less than Pmax, the value P is incremented at S320. In this process, the configuration point corresponding to the incremented number is selected, and all the ranging points are selected in turn by repeating the process. After completing this step, the process returns to S240. If the value of the configuration point P is greater than or equal to Pmax, the false image determination of the object I is performed at S330.

In this process, for example, the object I including the false image points the number of which is greater than or equal to the predetermined determination number is stored in the memory 19 assuming that all the ranging points configuring the object I are temporary false image points. The determination number can be set as required, and for example, the determination number may be set to one to improve the determination speed, and the determination number may be set to more than one to reduce the influence of noise.

Subsequently, at S340, the number assigned to the object I and the number of objects N are compared with each other. If the number assigned to the object I is less than the number of objects N, the number assigned to the object I is incremented at S350. In this process, the object corresponding to the incremented number is selected. After completing this step, the process returns to S230.

Furthermore, at S340, if the number assigned to object I is greater than or equal to the number of objects N, the false image determining process is terminated.

[1-3. Advantages]

The first embodiment described above has the following advantages.

(1 a) The radar controller 11 of the driving assistance system 1 acquires the ranging point information in which the distances to the ranging points are associated with each of the electromagnetic wave applying directions. The radar controller 11 determines whether the object region that represents the region encompassed by joining the ranging points that are in close proximity to one another exists in front of specific ranging point representing a certain ranging point among the ranging points. The radar controller 11 defines the ranging point in front of which the object region exists as the false image point representing a point where no object actually exists and excludes the false image point from the ranging point information.

According to the driving assistance system 1 described above, if the object region exists around the specific ranging point, the specific ranging point is recognized as the false image point caused due to, for example, reflection off an object. Thus, whether the object is the false image is recognized with high accuracy.

(1b) The radar controller 11 of the driving assistance system 1 defines the object region configured by the ranging points located on the same plane as the configuration surface and determines whether the configuration surface exists in front of the specific ranging point.

According to the driving assistance system 1 described above, the specific ranging point is defined as the false image point if the configuration surface exists in front of the specific ranging point. Thus, the probability of being the false image point is more accurately determined.

(1c) When multiple ranging points in the same applying direction are obtained, the radar controller 11 of the driving assistance system 1 determines whether the surrounding points that are adjacent to the applying direction configure the configuration surface in order to determine whether the configuration surface exists in front of the specific ranging point.

The driving assistance system 1 described above only needs to determine whether the configuration surface exists when multiple ranging points in the same applying direction are obtained. Thus, compared with a configuration in which whether the configuration surface exists is determined in regard to all the ranging points, the processing load during determination is reduced.

(1d) The radar controller 11 of the driving assistance system 1 identifies multiple ranging points object by object and excludes, from the ranging point information, the ranging points configuring the object that includes the false image points by the predetermined determination number or more among the ranging points.

According to the driving assistance system 1 described above, since the ranging points configuring the object that includes the predetermined determination number or more of the false image points are excluded from the ranging point information, the ranging points of the object that is the false image are collectively excluded.

(1e) The radar controller 11 of the driving assistance system 1 repeatedly acquires the ranging point information and repeatedly determines whether the object region exists in accordance with the repeatedly acquired ranging point information. The existence of the object region is monitored in time-series, and if the existence satisfies the predetermined false image requirement, the false image point is excluded from the ranging point information.

According to the driving assistance system 1 described above, the detection point in the distance is defined as the false image point when the existence of the object region satisfies the false image requirement. Thus, if the object region is erroneously detected temporarily due to the influence of, for example, noise, the ranging point is unlikely to be erroneously determined as the false image point.

(1f) If, as the false image requirement, the requirement that the object region exists consecutively the predetermined specified number of times or more is satisfied, the radar controller 11 of the driving assistance system 1 excludes the false image point from the ranging point information.

According to the driving assistance system 1 described above, since the specific ranging point is defined as the false image point if the requirement that the object region exists consecutively the specified number of times or more is satisfied, the false image point is detected more accurately.

2. Other Embodiments

Although the embodiment of the present disclosure has been described above, the present disclosure is not limited to the above-described embodiment and can be implemented in various modifications.

(2a) The above embodiment describes an example of forming the configuration surface when the ranging points arranged at positions closer than the configuration point P are within the range of the threshold values. However, the configuration is not limited to this. For instance, the existence of the object region may be determined assuming that the configuration surface is formed by the ranging points the distance between which is less than a predetermined threshold value, or the existence of the object region may be determined in accordance with, for example, the linearity of the ranging points arranged in front of the configuration point P or whether the coordinates of the ranging points are arranged on the two-dimensional plane.

(2b) Multiple functions of one component of the above embodiment may be performed by multiple components, or one function of one component may be performed by multiple components. Alternatively, multiple functions of the multiple components may be performed by one component, or one function performed by the multiple components may be performed by one component. Part of the configuration of the above embodiment may be omitted. Furthermore, at least part of the configuration of the above embodiment may be added to or replaced with a different configuration of the above embodiment. The embodiment of the present disclosure includes any aspect included in the technical ideas specified by the language of the claims.

(2c) Besides the above-described driving assistance system 1, the present disclosure may be implemented in various forms such as a device that is a component of the driving assistance system 1, a program that allows a computer to function as the driving assistance system 1, a non-transitory actual storage medium such as a semiconductor memory storing the program, a driving assistance method, and a position recognizing method.

3. Correspondence Between Configuration of Embodiment and Configuration of Present Disclosure The driving assistance system 1 according to the above embodiment corresponds to a position recognizing device of the present disclosure, and the selected configuration point P according to the above embodiment corresponds to the specific ranging point of the present disclosure. Furthermore, the process of S110 among the processes executed by the radar controller 11 in the above embodiment corresponds to a ranging point acquiring section of the present disclosure, and the process of S120 in the above embodiment corresponds to an object identifying section of the present disclosure. Moreover, the processes of S240, S250, S260, and S330 in the above embodiment correspond to a region determining section of the present disclosure, and the processes S140, S150, and S160 in the above embodiment correspond to a ranging point excluding section of the present disclosure.

The invention claimed is:

1. A position recognizing device configured to recognize a position of a target object, the device comprising:
   a ranging point acquiring section configured to acquire ranging point information in which distances to a plurality of ranging points are associated with each of electromagnetic wave applying directions;
   a region determining section configured to determine whether an object region, which represents a region encompassed by joining a plurality of ranging points that are in close proximity to one another, exists at a position closer than a specific ranging point, which represents a certain ranging point among the plurality of ranging points when viewed from the position recognizing device, the specific ranging point being covered by the object region; and
   a ranging point excluding section configured to define the specific ranging point in front of which the object region exists as a false image point, which represents a point where no object actually exists, and exclude the false image point from the ranging point information.

2. The position recognizing device according to claim 1, wherein
   the region determining section defines the object region configured by a plurality of ranging points located on a same plane as a configuration surface and determines whether the configuration surface exists at a position closer than the specific ranging point.

3. The position recognizing device according to claim 2, wherein
   when a plurality of ranging points in a same applying direction are obtained, the region determining section determines whether surrounding points adjacent to the applying direction configure the configuration surface in order to determine whether the configuration surface exists at a position closer than the specific ranging point.

4. The position recognizing device according to claim 1, further comprising
   an object identifying section configured to identify a plurality of ranging points object by object, wherein
   the ranging point excluding section excludes, from the ranging point information, a plurality of ranging points configuring an object including the false image point which have a predetermined determination number or more among the plurality of ranging points.

5. The position recognizing device according to claim 1, wherein
   the ranging point acquiring section is configured to repeatedly acquire the ranging point information, the region determining section is configured to repeatedly determine whether the object region exists in accordance with the repeatedly acquired ranging point information, and the ranging point excluding section is configured to monitor the existence of the object region in time-series and exclude the false image point from the ranging point information when the existence satisfies a predetermined false image requirement.

6. The position recognizing device according to claim 5, wherein when, as the false image requirement, a requirement that the object region exists consecutively a predetermined specified number of times or more is satisfied, the ranging point excluding section is configured to exclude the false image point from the ranging point information.

7. A position recognizing device comprising:

a ranging point acquiring section configured to acquire ranging point information in which distances to a plurality of ranging points are associated with each of electromagnetic wave applying directions;

a region determining section configured to determine whether an object region, which is represented by a plurality of ranging points in close proximity to one another, exists at a position closer than a specific ranging point, which represents a certain ranging point among the plurality of ranging points when viewed from the position recognizing device, the specific ranging point being covered by the object region; and a ranging point excluding section configured to exclude the specific ranging point in front of which the object region exists from the ranging point information.

8. A position recognizing method comprising:

acquiring ranging point information in which distances to a plurality of ranging points are associated with each of electromagnetic wave applying directions;

determining whether an object region, which is represented by a plurality of ranging points in close proximity to one another, exists at a position closer than a specific ranging point, which represents a certain ranging point among the plurality of ranging points, the specific ranging point being covered by the object region; and excluding the specific ranging point in front of which the object region exists from the ranging point information.

9. A position recognizing device configured to recognize a position of a target object, the device comprising:

a ranging point acquiring section configured to acquire ranging point information in which distances to a plurality of ranging points are associated with each of electromagnetic wave applying directions;

a region determining section configured to define an object region as a configuration surface that represents a region encompassed by joining a plurality of ranging points that are located on a same plane and are in close proximity to one another, and to determine whether the configuration surface exists at a position closer than a specific ranging point, which represents a certain ranging point among the plurality of ranging points; and a ranging point excluding section configured to define the specific ranging point in front of which the object region exists as a false image point representing a point where no object actually exists and exclude the false image point from the ranging point information.

10. A position recognizing device comprising:

a ranging point acquiring section configured to acquire ranging point information in which distances to a plurality of ranging points are associated with each of electromagnetic wave applying directions;

a region determining section configured to define an object region as a configuration surface that is represented by a plurality of ranging points that are located on a same plane and are in close proximity to one another, and to determine whether the configuration surface exists at a position closer than a specific ranging point, which represents a certain ranging point among the plurality of ranging points; and a ranging point excluding section configured to exclude the specific ranging point in front of which the object region exists from the ranging point information.

11. A position recognizing method comprising:

acquiring ranging point information in which distances to a plurality of ranging points are associated with each of electromagnetic wave applying directions;

defining an object region as a configuration surface that is represented by a plurality of ranging points that are located on a same plane and are in close proximity to one another, and determining whether the configuration surface exists at a position closer than a specific ranging point, which represents a certain ranging point among the plurality of ranging points; and excluding the specific ranging point in front of which the object region exists from the ranging point information.

* * * * *